United States Patent
Milton

(10) Patent No.: US 7,046,742 B2
(45) Date of Patent: *May 16, 2006

(54) SYSTEM AND METHOD FOR TEMPORAL ANALYSIS OF SERIAL DATA

(75) Inventor: Paul Spencer Milton, San Diego, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 759 days.

This patent is subject to a terminal disclaimer.

(21) Appl. No.: 10/193,961

(22) Filed: Jul. 12, 2002

(65) Prior Publication Data

US 2003/0110439 A1 Jun. 12, 2003

Related U.S. Application Data

(63) Continuation-in-part of application No. 10/020,426, filed on Dec. 7, 2001.

(51) Int. Cl.
*H04L 25/06* (2006.01)
*H04L 25/10* (2006.01)

(52) U.S. Cl. .................. 375/317; 375/316; 375/329

(58) Field of Classification Search ................ 375/317
See application file for complete search history.

(56) References Cited

U.S. PATENT DOCUMENTS 3,670,304 A * 6/1972 Andresen et al. ............ 714/709

* cited by examiner

*Primary Examiner*—Chieh M. Fan
*Assistant Examiner*—Erin M. File
(74) *Attorney, Agent, or Firm*—Law Office of Gerald Maliszewski; Gerald Maliszewski

(57) ABSTRACT

A system and method are provided for temporally analyzing serial input data. The method comprises: establishing three thresholds; distinguishing present (first) high probability one bit value estimates; distinguishing present high probability zero bit value estimates; and, using a temporal analysis of bit values to distinguish indefinite present bit value estimates. Using a temporal analysis of bit values includes: distinguishing a present bit estimate below first threshold and above the third threshold as a zero if both the past (second) and the future (third) bits are one values and otherwise as a one; and, distinguishing a present bit value estimate above the second threshold and below the third threshold as a one if both the past and future bits are a zero value and otherwise as a zero.

13 Claims, 4 Drawing Sheets

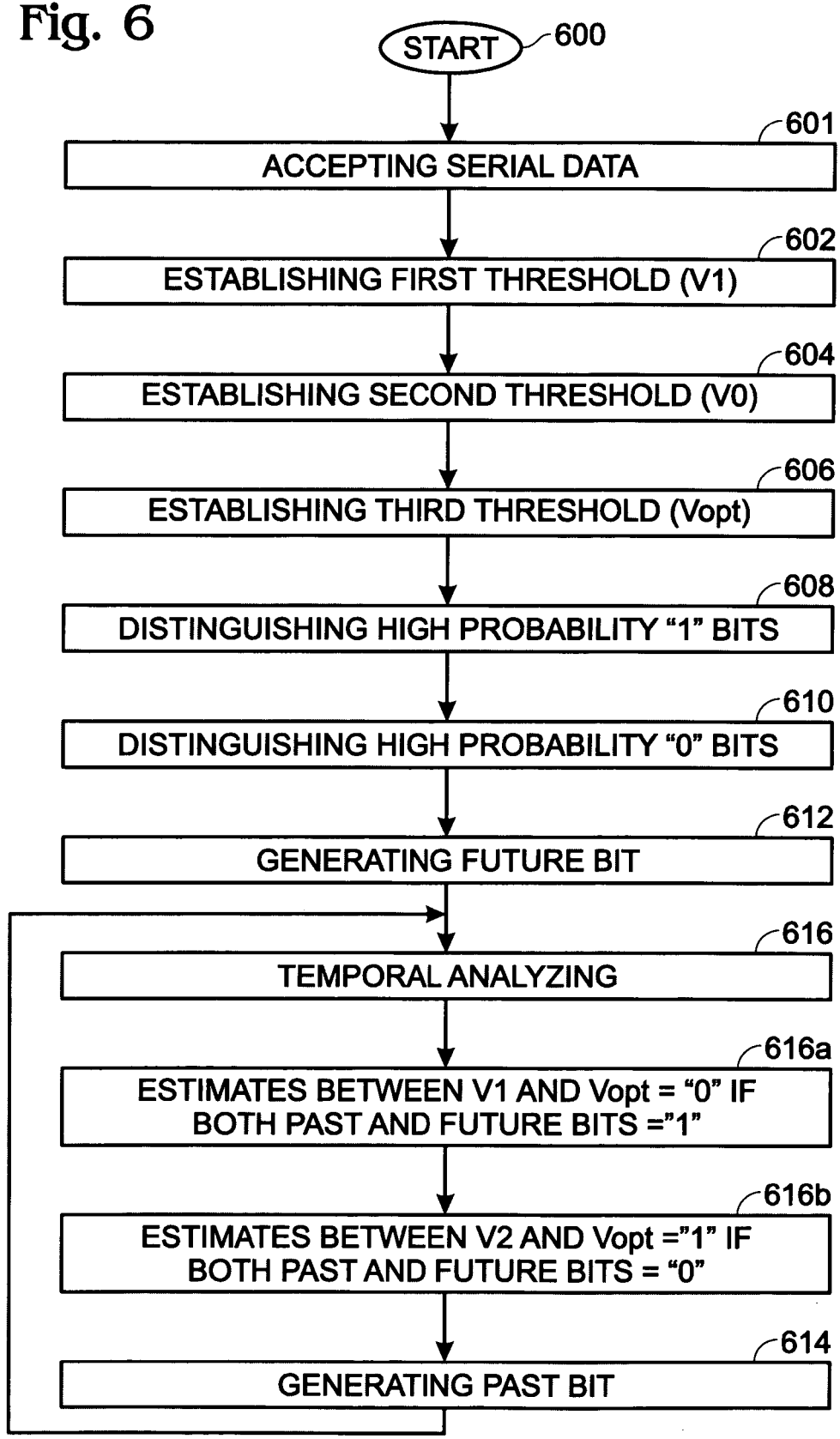

SYSTEM AND METHOD FOR TEMPORAL ANALYSIS OF SERIAL DATA

RELATED APPLICATIONS

This application is a continuation-in-part of a pending application entitled, SYSTEM AND METHOD FOR NON-CAUSAL CHANNEL EQUALIZATION, invented by Castagnozzi et al., Ser. No. 10/020,426, filed Dec. 7, 2001.

This application is related to a pending application entitled, SYSTEM AND METHOD FOR NON-CAUSAL CHANNEL EQUALIZATION IN AN ASYMMETRICAL NOISE ENVIRONMENT, invented by Yuan et al., Ser. No. 10/066,966, filed Feb. 4, 2002.

This application is related to a pending application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002.

This application is related to a pending application entitled, SYSTEM AND METHOD FOR ADJUSTING A NON-RETURN TO ZERO DATA STREAM INPUT THRESHOLD, invented by Acikel et al., Ser. No. 10/077,274, filed Feb. 15, 2002.

This application is related to a pending application entitled, SYSTEM AND METHOD FOR FIVE-LEVEL NON-CAUSAL CHANNEL EQUALIZATION, invented by Yuan et al, Ser. No. 10/150,301, filed May 17, 2002.

BACKGROUND OF THE INVENTION

1. Field of the Invention

This invention generally relates to digital communications and, more particularly, to a system and method for minimizing the effects of inter-symbol interference in a non-return to zero (NRZ) data channel.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of NRZ data streams. However, received bits can be characterized with probability density functions, as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if bit value decisions could be made based upon the preceding and subsequent bit values.

SUMMARY OF THE INVENTION

Many communication channels exhibit temporal spreading of the signaling waveform when propagating over long distances or over nonlinear media. This phenomenon is not effectively addressed by traditional linear equalization techniques due to the non-causal nature of the impairment. In the context of a method to reduce the effects of pulse spreading on hard-decision error rate in communication systems affected by this problem, the present invention processes multiple decision data, to reduce the data to a single hard decision per bit. The multiple data thresholds are adjusted for optimal mitigation of the spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. The refined decision is output from the device and fed-backwards to be used in processing of subsequent bits.

Accordingly, a method is provided for temporally analyzing serial input data. The method comprises: establishing three thresholds; a first threshold at a relatively high voltage level distinguishes present (first) high probability one bit value estimates; a second threshold at a relatively low threshold level distinguishes present high probability zero bit value estimates; and, using a temporal analysis of bit values to distinguish indefinite present bit value estimates. A third threshold is set approximately midway between the first and second thresholds.

Using a temporal analysis of bit values to distinguish indefinite present bit value estimates includes: distinguishing a present bit estimate below first threshold and above the third threshold as a zero if both the past (second) and the future (third) bits are one values, as a one if only one of the past and future bits is a one value, and as one if both the past and future bits are a zero value; and, distinguishing a present bit value estimate above the second threshold and below the third threshold as a one if both the past and future bits are a zero value, as a zero if only one of the past and future values is a zero value, and as a zero if both the past and future bits are a one value.

More specifically, using a temporal analysis of bit values to distinguish indefinite present bit value estimates includes: comparing the outputs of first, second, and third thresholds to supply two encoded bits; and, comparing the two encoded bits, the future bit value, and the past bit value.

Additional details of the above-described method and a system for the temporal analysis of serial data are provided below.

BRIEF DESCRIPTION OF THE DRAWINGS

FIG. 6 is a flowchart illustrating the present invention method for temporally analyzing serial input data.

DETAILED DESCRIPTION OF THE PREFERRED EMBODIMENTS

Figure 3:
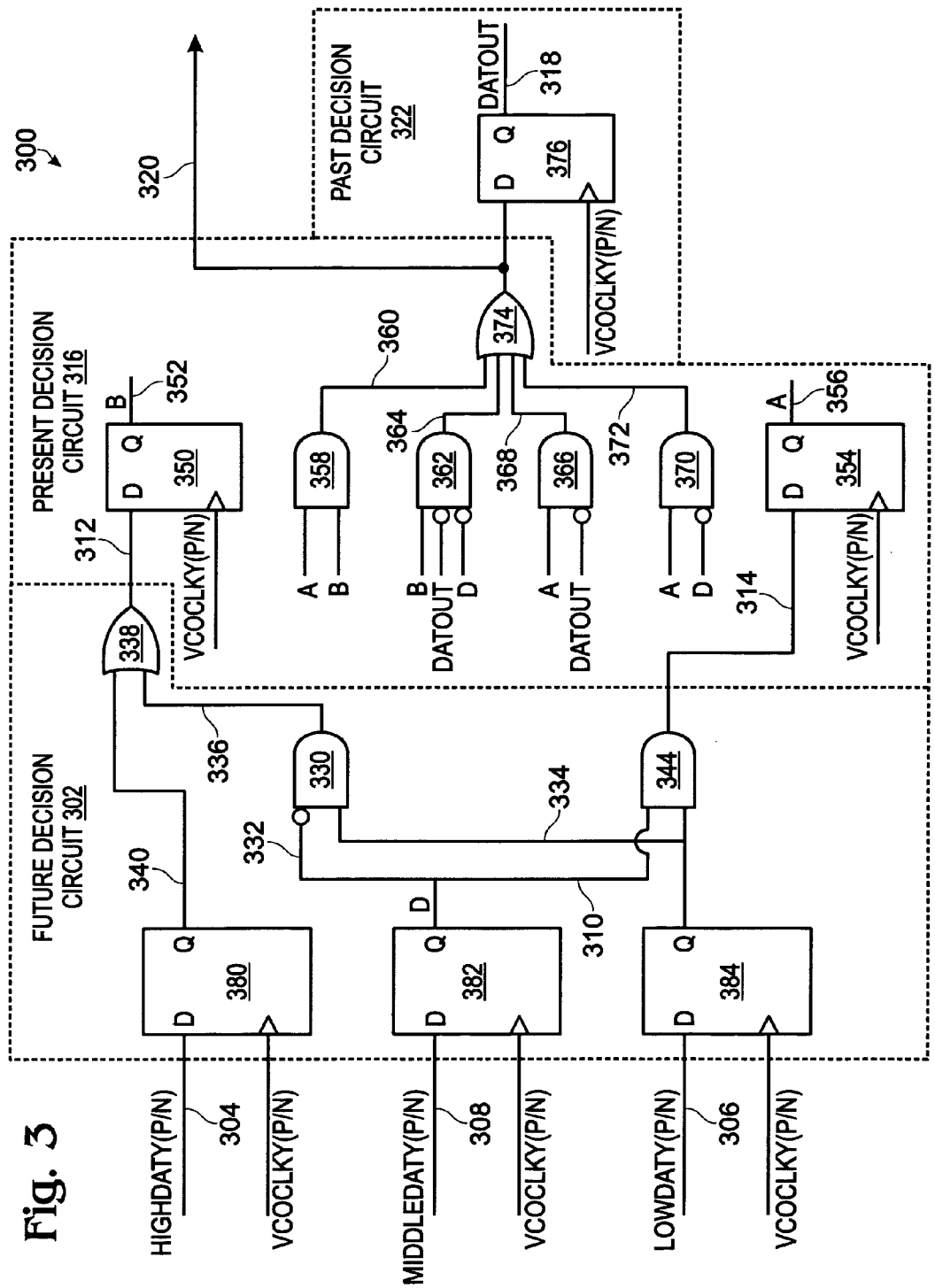
FIG. 3 is a schematic block diagram of the present invention system for temporal analysis of serial input data.

FIG. 3 is a schematic block diagram of the present invention system for temporal analysis of serial input data. The system 300, also called a non-causal circuit, comprises a future decision circuit 302 having inputs to receive high probability "1" bit value estimates on line 304, high probability "0" bit value estimates on line 306, and indefinite bit value estimates on line 308. The future decision circuit 302 has an output on line 310 (D) to supply a future (third) bit value and outputs on lines 312 and 314 to supply present bit value estimates.

A present decision circuit 316 has inputs to accept the future bit value on line 310, the present bit value estimates on lines 312 and 314, and a past (second) bit value on line 318. The present decision circuit 316 has an output on line 320 to supply a present (first) bit value. A past decision circuit 322 has an input on line 320 to accept the present bit value and an output on line 318 (DATAOUT) to supply the past bit value.

Figure 4:
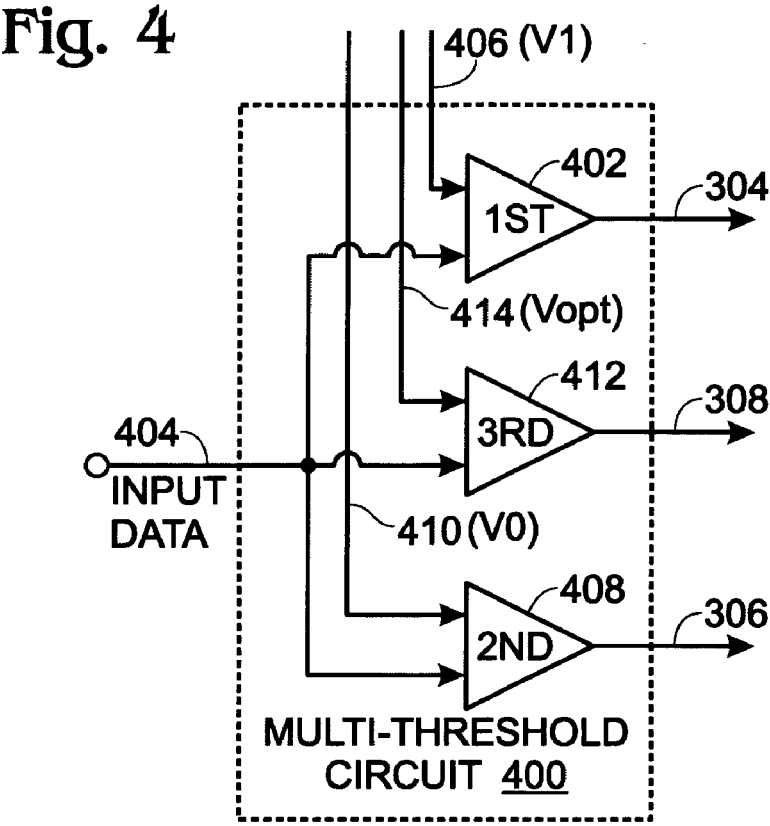
FIG. 4 is a schematic block diagram of a multi-threshold circuit associated with the present invention system.

FIG. 4 is a schematic block diagram of a multi-threshold circuit associated with the present invention system. The multi-threshold circuit 400 includes a first comparator 402 having an input on line 404 to accept a pseudorandom data stream, an input on line 406 establishing a first threshold (V1), and an output on line 304 connected to the future decision circuit input to supply a high probability one bit value estimate. The first threshold is set to a relatively high voltage level to ensure that only a bit with a very high probability of being a one value triggers the first comparator 402. Referencing FIG. 2 briefly, the first threshold is associated with the PDF (1) function.

Returning to FIG. 4, a second comparator 408 has an input on line 404 to accept the pseudorandom data stream, an input on line 410 establishing a second threshold (V0), and an output on line 306 connected to the future decision circuit to supply a high probability zero bit value estimate. The second threshold is set to a relatively low voltage level to ensure that only a bit with a very high probability of being a zero value doesn't trigger the second comparator 408. Referencing FIG. 2 briefly, the second threshold is associated with the PDF (0) function.

Figure 1:
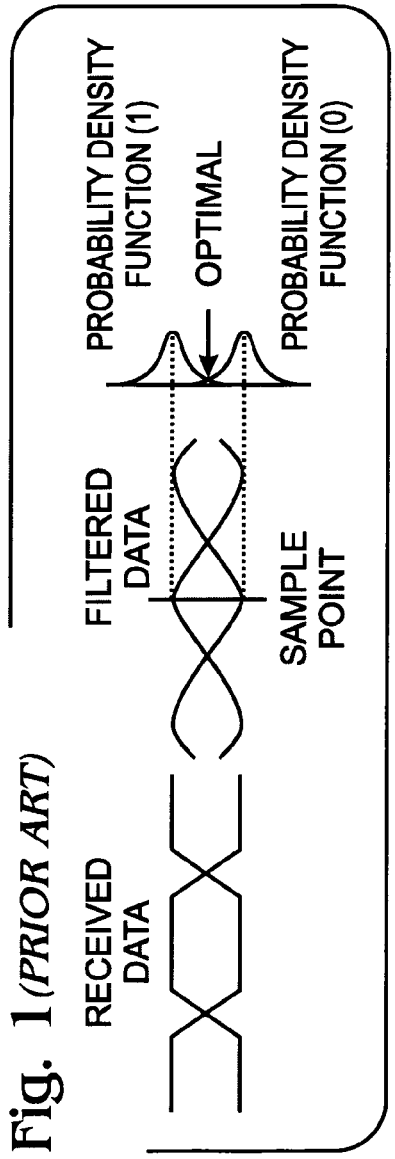
FIG. 1 is a diagram illustrating a signal recovered from a binary symmetric, non-dispersive channel in the presence of noise (prior art).
Figure 2:
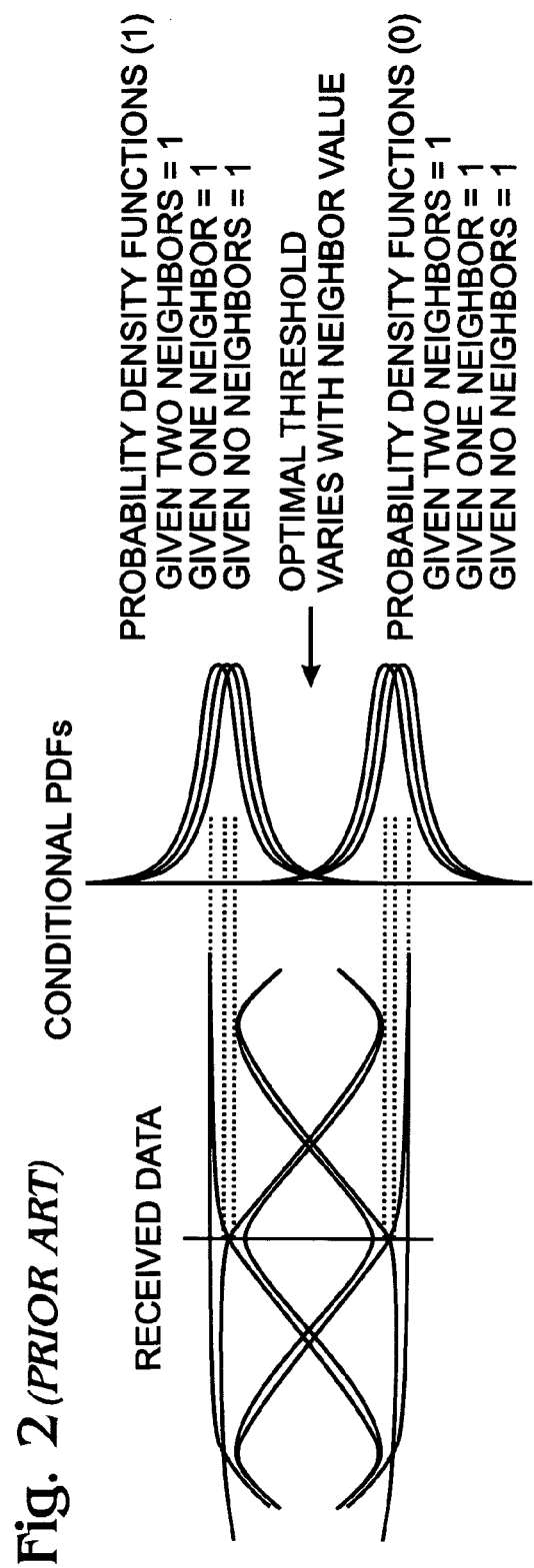
FIG. 2 is a diagram illustrating received waveforms that are distorted in response to the inter-symbol interference resulting from energy dispersion (prior art).

Returning to FIG. 4, a third comparator 412 has an input on line 404 to accept the pseudorandom data stream, an input on line 414 establishing a third threshold (Vopt), and an output on line 308 connected to the future decision to supply indefinite bit value estimates between the first and second thresholds. The third threshold is set to the nominal mid-voltage point between the first and second thresholds. Referring to FIG. 2, the third threshold is the optimal threshold.

Returning to FIG. 4, in some aspects of the system the first, second, and third comparators 402/408/412 receive non-return to zero (NRZ) input data. However, the present invention system is applicable to other serial data modulation formats.

Figure 5:
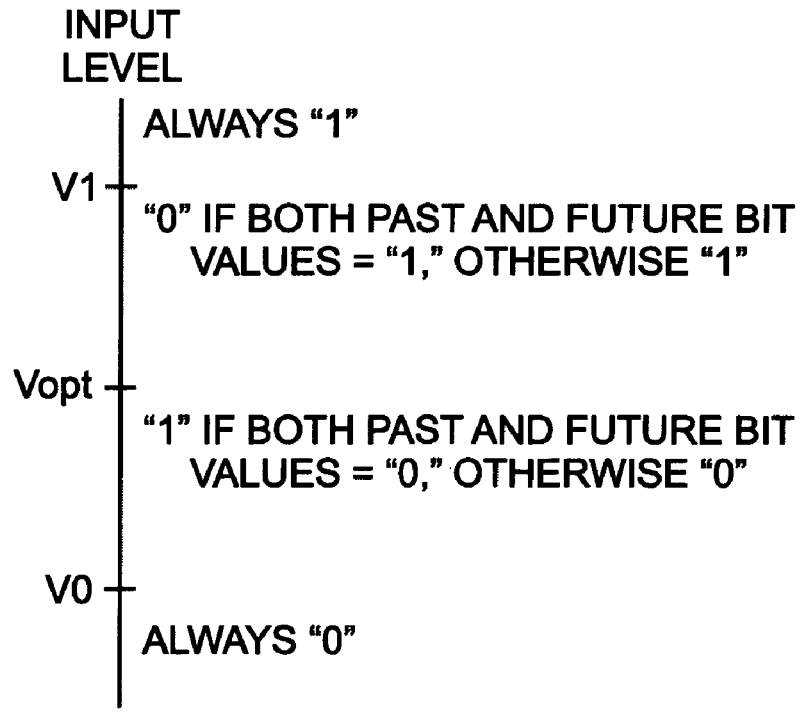
FIG. 5 is the present decision circuit truth table.

FIG. 5 is the present decision circuit truth table. The present decision circuit distinguishes a present bit estimate below first threshold and above the third threshold as a zero if both the past and the future bits are one values, as a one if only one of the past and future bits is a one value, and as one if both the past and future bits are a zero value. The present decision circuit distinguishes a present bit estimate above the second threshold and below the third threshold as a one if both the past and future bits are a zero value, as a zero if only one of the past and future values is a zero value, and as a zero if both the past and future bits are a one value.

Returning to FIG. 3, the future decision circuit 302 includes a first AND gate 330 having an inverted input on line 332 connected to the output of the third comparator, an input connected to the output of the second comparator on line 334, and an output on line 336. A first OR gate 338 has an input connected to the output of the first AND gate on line 336, an input connected to the output of the first comparator on line 340, and an output on line 312. A second AND gate 344 has an input connected to the output of the third comparator on line 310, an input connected to the output of the second comparator on line 334, and an output on line 314.

The present decision circuit 316 includes a first retimer 350 having an input connected to the output of the first OR gate on line 312 and an output on line 352 (B). The retimer 350 retimes input signals to a clock cycle, where the clock is determined by the input data rate (VCOCLK). A second retimer 354 has an input connected to the output of the second AND gate on line 314 and an output on line 356 (A). The retiming circuitry insures that a simultaneous analysis is made upon the same bit.

A third AND gate 358 has an input connected to the output of the first retimer on line 352, an input connected to the output of the second retimer on line 356, and an output on line 360. A fourth AND gate 362 has an input connected to the output of the first retimer on line 352, an inverted input connected to the output of the past decision circuit on line 318, an inverted input connected to the output of the third comparator on line 310, and an output on line 364. A fifth AND gate 366 has an input connected to the output of the second retimer on line 356, an inverted input connected to the output of the past decision circuit on line 318, and an output on line 368.

A sixth AND gate 370 has an input connected to the output of the second retimer on line 356, an inverted input connected to the output of the third comparator on line 310, and an output on line 372. A second OR gate 374 has an input connected to the output of the third AND gate on line 360, an input connected to the output of the fourth AND gate on line 364, an input connected to the output of the fifth AND gate on line 368, an input connected to the output of the sixth AND gate on line 372, and an output on line 320 to supply the present bit value.

The past decision circuit 322 includes a third retimer 376 having an input connected to the output of the second OR gate on line 320 and an output on line 318 to supply the past bit value.

As shown, the first retimer 350, second retimer 354, and third retimer 376 are D flip-flops. A receiver generated data clock is used for clocking the flip-flops. However, other retiming mechanisms can be used, especially in situations where the clock rates are predetermined or the timing errors can be anticipated.

In some aspects of the system 300, the future decision circuit 302 includes a fourth retimer 380 having an input connected to the output of the first comparator on line 304 and an output connected to the first OR gate on line 340. A fifth retimer 382 has an input connected to the output of the third comparator on line 308 and an output connected to the first AND gate, second AND gate, fourth AND gate, and sixth AND gate on line 310. A sixth retimer 384 has an input connected to the output of the second comparator on line 306 and an output connected to the first and second AND gates on line 334. As shown, the fourth retimer 380, the fifth retimer 382, and the sixth retimer 384 are D flip-flops.

FIG. 6 is a flowchart illustrating the present invention method for temporally analyzing serial input data. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600. Step 601 accepts pseudorandom serial input data. In some aspects, non-return to zero (NRZ) data is accepted in Step 601. Step 602 establishes a first threshold (V1) to distinguish present high probability one bit value estimates. Step 604 establishes a second threshold (V0) to distinguish present high probability zero bit value estimates. Data triggering the V1 threshold is assumed to be a definite one value, and data that fails to trigger the V2 threshold is assumed to be a definite zero value. Step 606 establishes a third threshold (Vopt) to distinguish indefinite present bit value estimates between the first and second thresholds. Step 608 distinguishes present (first) high probability one bit value estimates. Step 610 distinguishes present high probability zero bit value estimates. Step 612 uses the third threshold to generate a future bit value. Step 614 delays a previous present bit value to generate the past bit value. Step 616 uses a temporal analysis of bit values to distinguish indefinite present bit value estimates.

In some aspects of the method, using a temporal analysis of bit values to distinguish indefinite present bit value estimates in Step 616 includes substeps. Step 616a distinguishes a present bit estimate below first threshold and above the third threshold as a zero if both the past (second) and the future (third) bits are one values, as a one if only one of the past and future bits is a one value, and as one if both the past and future bits are a zero value. Step 616b distinguishes a present bit value estimate above the second threshold and below the third threshold as a one if both the past and future bits are a zero value, as a zero if only one of the past and future values is a zero value, and as a zero if both the past and future bits are a one value.

In some aspects, using a temporal analysis of bit values to distinguish indefinite present bit value estimates in Step 616 includes further substeps (not shown). Step 616c compares the outputs of the first, second, and third thresholds to supply two encoded bits. Step 616d compares the two encoded bits, the future bit value, and the past bit value.

A system and method for the temporal analysis of serial data have been provided. Examples have been given of specific circuits that can be used to generate the present decision circuit truth table. However, other variations and embodiments of these circuits could be implemented by those skilled in the art.

I claim:

1. A method for temporally analyzing serial input data, the method comprising:
    establishing a first threshold (V1) to distinguish present high probability one bit value estimates;
    establishing a second threshold (V0) to distinguish present high probability zero bit value estimates;
    establishing a third threshold (Vopt) to distinguish indefinite present bit value estimates between the first and second thresholds;
    distinguish present (first) high probability one bit value estimates;
    distinguishing present high probability zero bit value estimates; and,
    using a temporal analysis of bit values to distinguish indefinite present bit value estimates as follows:
        distinguishing a present bit estimate below first threshold and above the third threshold as a zero if both the past (second) and the future (third) bits are one values, as a one if only one of the past and future bits is a one value, and as one if both the past and future bits are a zero value; and,
        distinguishing a present bit value estimate above the second threshold and below the third threshold as a one if both the past and future bits are a zero value, as a zero if only one of the past and future values is a zero value, and as a zero if both the past and future bits are a one value.

2. The method of claim 1 further comprising:
    using the third threshold to generate a future bit value; and,
    delaying a previous present bit value to generate the past bit value.

3. The method of claim 2 wherein using a temporal analysis of bit values to distinguish indefinite present bit value estimates includes:
    comparing the outputs of the first, second, and third thresholds to supply two encoded bits; and,
    comparing the two encoded bits, the future bit value, and the past bit value.

4. The method of claim 1 further comprising:
    accepting pseudorandom serial input data.

5. The method of claim 4 wherein accepting pseudorandom serial input data includes accepting non-return to zero (NRZ) data.

6. A system for the temporal analysis of serial input data, the system comprising:
    a future decision circuit having inputs to receive high probability "1" bit value estimates, high probability "0" bit value estimates, indefinite bit value estimates, an output to supply a future (third) bit value, and an output to supply present bit value estimates;

a present decision circuit having inputs to accept the future bit value, the present bit value estimates, and a past (second) bit value, and an output to supply a present (first) bit value;

a past decision circuit having an input to accept the present bit value and an output to supply the past bit value;

a first comparator having an input to accept a pseudorandom data stream, an input establishing a first threshold (V1), and an output connected to the future decision circuit input to supply a high probability one bit value estimate;

a second comparator having an input to accept the pseudorandom data stream, an input establishing a second threshold (V0), and an output connected to the future decision circuit to supply a high probability zero bit value estimate; and, a third comparator having an input to accept the pseudorandom data stream, an input establishing a third threshold (Vopt) and an output connected to the future decision to supply indefinite bit value estimates between the first and second thresholds; and, wherein the present decision circuit:

distinguishes a present bit estimate below first threshold and above the third threshold as a zero if both the past and the future bits are one values, as a one if only one of the past and future bits is a one value, and as one if both the past and future bits are a zero value; and, distinguishes a present bit estimate above the second threshold and below the third threshold as a one if both the past and future bits are a zero value, as a zero if only one of the past and future values is a zero value, and as a zero if both the past and future bits are a one value.

7. The system of claim 6 wherein the future decision circuit includes:

a first AND gate having an inverted input connected to the output of the third comparator, an input connected to the output of the second comparator, and an output;

a first OR gate having an input connected to the output of the first AND gate, an input connected to the output of the first comparator, and an output; and, a second AND gate having an input connected to the output of the third comparator, an input connected to the output of the second comparator, and an output.

8. The system of claim 7 wherein the present decision circuit includes:

a first retimer having an input connected to the output of the first OR gate and an output;

a second retimer having an input connected to the output of the second AND gate and an output;

a third AND gate having an input connected to the output of the first retimer, an input connected to the output of the second retimer, and an output;

a fourth AND gate having an input connected to the output of the first retimer, an inverted input connected to the output of the past decision circuit, an inverted input connected to the output of the third comparator, and an output;

a fifth AND gate having an input connected to the output of the second retimer, an inverted input connected to the output of the past decision circuit, and an output;

a sixth AND gate having an input connected to the output of the second retimer, an inverted input connected to the output of the third comparator, and an output; and, a second OR gate having an input connected to the output of the third AND gate, an input connected to the output of the fourth AND gate, an input connected to the output of the fifth AND gate, an input connected to the output of the sixth AND gate, and an output to supply the present bit value.

9. The system of claim 8 wherein the past decision circuit includes a third retimer having an input connected to the output of the second OR gate and an output to supply the past bit value.

10. The system of claim 9 wherein the first, second, and third retimer are D flip-flops.

11. The system of claim 9 wherein the future decision circuit further includes:

a fourth retimer having an input connected to the output of the first comparator and an output connected to the first OR gate;

a fifth retimer having an input connected to the output of the third comparator and an output connected to the first AND gate, second AND gate, fourth AND gate, and sixth AND gate; and, a sixth retimer having an input connected to the output of the second comparator and an output connected to the first and second AND gates.

12. The system of claim 11 wherein the fourth, fifth, and sixth retimer are D flip-flops.

13. The system of claim 6 wherein the first, second, and third comparators receive non-return to zero (NRZ) input data.

* * * * *